US008942435B2

(12) United States Patent
Tsuzuki et al.

(10) Patent No.: US 8,942,435 B2
(45) Date of Patent: Jan. 27, 2015

(54) PRE-RECORD DATA STORAGE DEVICE AND PRE-RECORD DATA STORAGE METHOD

(75) Inventors: Kazuhisa Tsuzuki, Fukuoka (JP);
Takayuki Haraguchi, Fukuoka (JP);
Kentarou Ohkawa, Fukuoka (JP);
Kenichiro Sugimoto, Fukuoka (JP);
Takahiro Yamaguchi, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 141 days.

(21) Appl. No.: 13/806,921

(22) PCT Filed: Dec. 27, 2010

(86) PCT No.: PCT/JP2010/007582
§ 371 (c)(1),
(2), (4) Date: Dec. 26, 2012

(87) PCT Pub. No.: WO2012/001756
PCT Pub. Date: Jan. 5, 2012

(65) Prior Publication Data
US 2013/0101183 A1    Apr. 25, 2013

(30) Foreign Application Priority Data
Jun. 30, 2010    (JP) ................................ 2010-149274

(51) Int. Cl.
*G06K 9/00*    (2006.01)
*H04N 5/77*    (2006.01)
*H04N 5/91*    (2006.01)

(52) U.S. Cl.
CPC .............. *G06K 9/00228* (2013.01); *H04N 5/77* (2013.01); *H04N 5/91* (2013.01); *G06K 9/00221* (2013.01); *G06K 9/00771* (2013.01)

USPC .......................................... 382/118; 382/305

(58) Field of Classification Search
None
See application file for complete search history.

(56) References Cited

U.S. PATENT DOCUMENTS

| 7,158,657 | B2 | 1/2007 | Okazaki et al. | |
| 2001/0031072 | A1* | 10/2001 | Dobashi et al. | ............... 382/118 |
| 2005/0057653 | A1 | 3/2005 | Maruya | |
| 2009/0174805 | A1* | 7/2009 | Alberth et al. | ................ 348/345 |

FOREIGN PATENT DOCUMENTS

| JP | 2000-194961 | 7/2000 |
| JP | 2003-324720 | 11/2003 |

(Continued)

OTHER PUBLICATIONS

English translation of JP 2010087676 A, Apr. 15, 2010, 14 pages.*

*Primary Examiner* — Jon Chang
(74) *Attorney, Agent, or Firm* — Greenblum & Bernstein, P.L.C.

(57) ABSTRACT

A pre-record data storage device includes: a first recorder; a second recorder having a capacity larger than that of the first recorder; a face comparison processor that executes a face comparison process on a person's face detected from an image obtained by photographing the person; and a recording controller. The recording controller allows the first recorder to start pre-recording of the image of the person from a face detection time when the person's face is detected, and to finish the pre-recording at a matched time when matching is confirmed as a result of the face comparison process of the face comparison processor. The recording controller stores pre-recorded data from the face detection time to the matched time in the second recorder.

5 Claims, 7 Drawing Sheets

(56) References Cited

FOREIGN PATENT DOCUMENTS

| | | |
|---|---|---|
| JP | 2004-088170 | 3/2004 |
| JP | 2008-228119 | 9/2008 |
| JP | 2008-278517 | 11/2008 |
| JP | 2008-305400 | 12/2008 |
| JP | 2010-002983 | 1/2010 |
| JP | 2010-021607 | 1/2010 |
| JP | 2010087676 A * | 4/2010 |

* cited by examiner

PRE-RECORD DATA STORAGE DEVICE AND PRE-RECORD DATA STORAGE METHOD

TECHNICAL FIELD

The present invention relates a pre-record data storage device and a pre-record data storage method suitable for a security monitoring system.

BACKGROUND ART

There has been developed a monitoring system that detects a monitoring event from an image taken by a camera, and records the image from the time of detection as a trigger (for example, Patent Document 1: "Image Storage Device, Monitoring System, and Storage Medium"). Image recording start is triggered, for example, when a person's face which has been photographed matches face information registered in advance as a result of comparison process the photographed face and the face information. In Patent Document 1, "when the number of areas determined as a flesh color in an input frame image exceeds a given number" is one trigger of the image recording start.

RELATED ART DOCUMENTS

Patent Documents

Patent Document 1: JP-A-2008-278517

SUMMARY OF THE INVENTION

Problem to be Solved by the Invention

Incidentally, in the monitoring system using the face comparison results as the trigger of the image recording start, when it takes time to conduct a face comparison process (for example, several seconds to a dozen seconds) such that a plurality of faces are compared with the face information, a person to be compared (object) moves out of a screen of a camera (frame out), which results in a problem that a necessary image cannot be recorded. This problem can be avoided by application of pre-recording for a fixed pre-recording time (a time when the recorded image is stored several seconds to a dozen seconds before a change actually occurs). However, there is a possibility that a face other than the object to be compared is also recorded, which results in a drawback that it is difficult to understand which face has been to be compared during the reproduction.

The present invention has been made in view of the above circumstances, and an object thereof is to provide a pre-record data storage device and a pre-record data storage method which can surely record the behavior of a person to be compared even if it takes time to conduct the face comparison process such that a plurality of faces compared with the face information.

Means for Solving the Problem

According to the present invention, there is provided a pre-record data storage device including: a first recorder; a second recorder having a capacity larger than that of the first recorder; a face comparison processor that executes a face comparison process on a person's face detected from an image obtained by photographing the person; and a recording controller that allows the first recorder to start pre-recording of the image of the person from a face detection time when the person's face is detected, and to finish the pre-recording at a matched time when matching is confirmed as a result of the face comparison process of the face comparison processor, and stores pre-recorded data from the face detection time to the matched time in the second recorder.

According to the above configuration, when the person's face is detected from the image obtained by photographing the person, the face comparison process is executed. Also, the first recording means is allowed to start the pre-recording of the image of the person from the face detection time, and finish the pre-recording at the matched time if matching is confirmed. In a case in which the first recording means executes the pre-recording, the data of the pre-recording is stored in the second recording means. Accordingly, even if it takes time to conduct the face comparison process, the behavior of the person to be compared during a comparison period can be recorded. Also, during reproduction, since the pre-recording of the person whose face is detected and matched is reproduced, it is not difficult to understand which face has been to be compared.

In the above configuration, there is provided a face detecting time storing means that stores the face detection time, and the recording control means uses the face detection time stored in the face detection time storing means as an index time of the pre-recorded data when the pre-recorded data from the face detection time to the matched time is stored in the second recording means.

According to the above configuration, the face detection time stored in the face detection time storing means is used as an index time of the pre-recorded data when the pre-recorded data from the face detection time to the matched time is stored in the second recording means. As a result, an intended recorded image of the person can be reproduced immediately.

According to the present invention, there is provided a pre-record data storage method including: executing a face comparison process on a person's face detected from an image obtained by photographing a person; and allowing a first recorder to start pre-recording of the image of the person from a face detection time when the person's face is detected, and to finish the pre-recording at a matched time when matching is confirmed as a result of the face comparison process and storing pre-recorded data from the face detection time to the matched time in a second recorder having a capacity larger than that of the first recorder.

According to the above method, when the person's face is detected from the image obtained by photographing the person, the face comparison process is executed. Also, the first recording means is allowed to start the pre-recording of the image of the person from the face detection time, and finish the pre-recording at the matched time if matching is confirmed. In a case in which the first recording means executes the pre-recording, the data of the pre-recording is stored in the second recording means. Accordingly, even if it takes time to conduct the face comparison process, the behavior of the person to be compared during a comparison period can be recorded. Also, during reproduction, since the pre-recording of the person whose face is detected and matched is reproduced, it is not difficult to understand which face has been to be compared.

According to the present invention, there is provided a pre-record data storage program that causes a computer to execute the steps of the above pre-record data storage method.

According to the above program, when the computer detects the person's face from the image obtained by photographing the person, the computer executes the face comparison process. Also, the computer allows the first recording means to start the pre-recording of the image of the person from the face detection time, and finish the pre-recording at the matched time if matching is confirmed. In a case in which the computer allows the first recording means to execute the pre-recording, the computer stores the data of the pre-recording in the second recording means. Accordingly, even if it takes time to conduct the face comparison process, the behavior of the person to be compared during a comparison period can be recorded. Also, during reproduction, since the pre-recording of the person whose face is detected and matched is reproduced, it is not difficult to understand which face has been to be compared.

Advantages of the Invention

According to the present invention, even it takes time to conduct the face comparison process such that a plurality of faces are compared, the behavior of the person to be compared can be recorded. Also, during the reproduction, since the pre-recording of the person whose face is detected and matched is reproduced, it is not difficult to understand which face has been to be compared.

MODE FOR CARRYING OUT THE INVENTION

Hereinafter, a description will be given in detail of preferred embodiments of the present invention with reference to the drawings.

Figure 1:
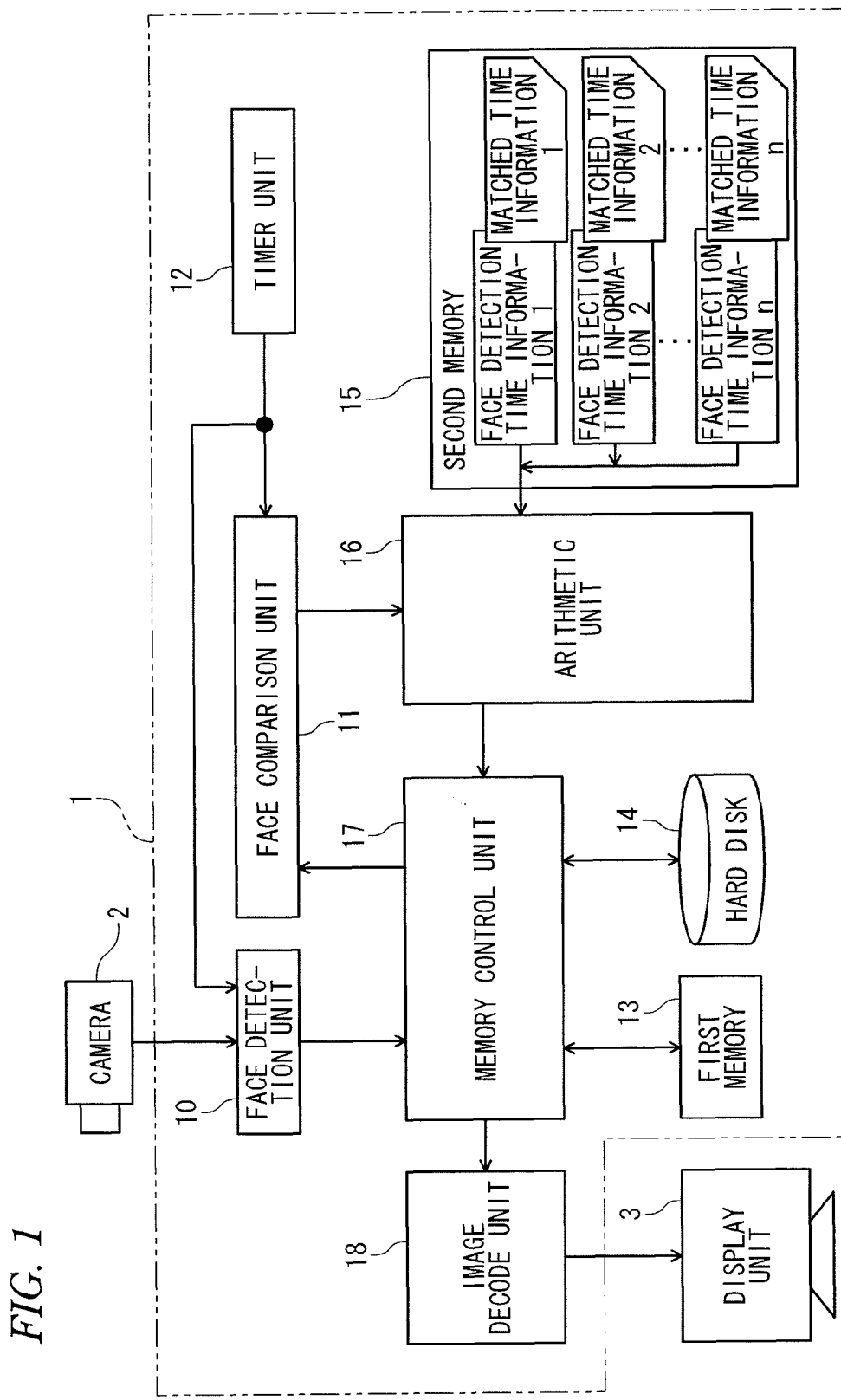
FIG. 1 is a block diagram illustrating an outline configuration of a pre-record data storage device according to an embodiment of the present invention.

FIG. 1 is a block diagram illustrating an outline configuration of a pre-record data storage device according to an embodiment of the present invention. In the figure, a pre-record data storage device 1 according to this embodiment includes a face detection unit 10, a face comparison unit 11, a timer unit 12, a first memory 13, a hard disk (HDD) 14, a second memory 15, an arithmetic unit 16, a memory control unit 17, and an image decode unit 18.

The face detection unit 10 outputs an image obtained by photographing a person by a camera 2, and detects a person's face from the image. Also, the face detection unit 10 acquires a time (hereinafter called "face detection time") when detecting the person's face from the timer unit 12. The face comparison unit 11 stores plural pieces of face information registered by a user (supervisor), and compares each of the plural pieces of registered face information with the person's face detected by the face detection unit 10, and then acquires a time (hereinafter called "matched time") when finding matched face information, from the timer unit 12. The face comparison unit 11 conducts the above processing every time the face is detected by the face detection unit 10.

The timer unit 12 outputs present time information. The arithmetic unit 16 stores a set of "face detection time information" and "matched time information" in the second memory 15 for each of the faces matched with the registered face information. It is preferable that the first memory 13 and the second memory 15 are formed of a nonvolatile semiconductor memory (for example, flash memory) that can rewrite data and does not erase data even if a power supply turns off.

When the human's face is detected by the face detection unit 10, the memory control unit 17 starts pre-recording in which the image output from the face detection unit 10 is recorded in the first memory 13. When the matched time is output from the face comparison unit 11, the memory control unit 17 finishes the pre-recording in which the image output from the face detection unit 10 is recorded in the first memory 13. When the pre-recording of the image of one person has been finished, the memory control unit 17 stores pre-recorded data recorded in the first memory 13 in the hard disk 14. In this situation, the memory control unit 17 uses a face detection time as an index time of the pre-recorded data, and also stores the index time in the hard disk 14.

The image decode unit 18 decodes the image output from the face detection unit 10, and outputs an image signal. A display unit 3 receives the image signal from the image decode unit 18, and displays the image.

Now, a description will be given in detail of a pre-recording process of the pre-record data storage device 1 according to this embodiment.

(Case where One Person is Detected)

Figure 2:
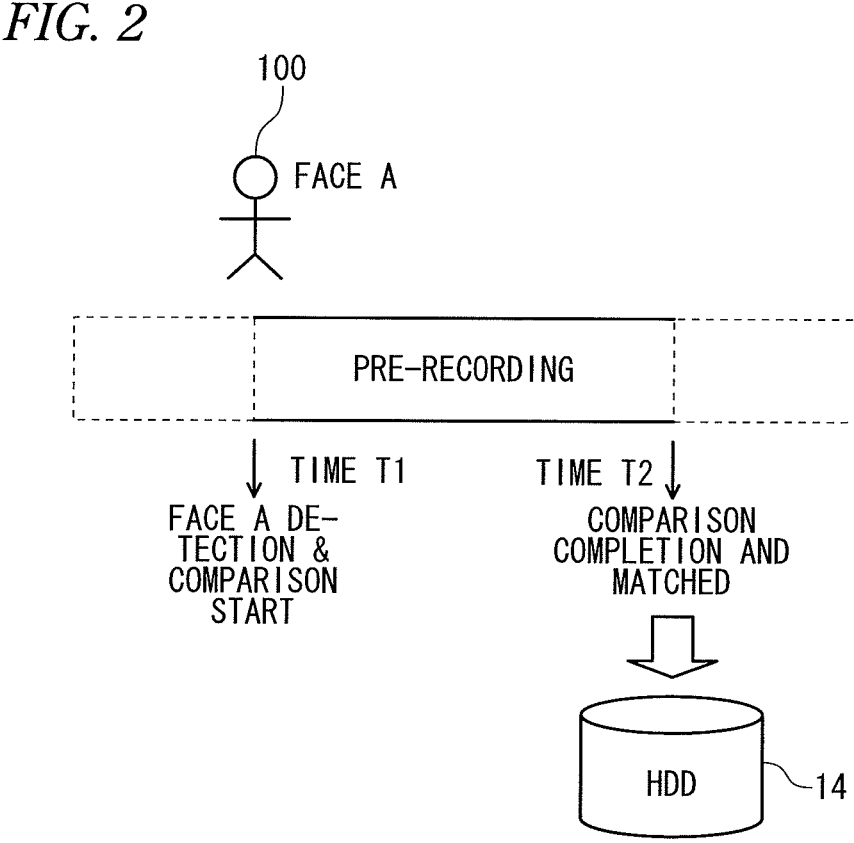
FIG. 2 is a diagram illustrating an outline of a pre-recording process in the pre-record data storage device of FIG. 1.

FIG. 2 is a diagram illustrating an outline of a pre-recording process when a face A of one person 100 is detected. Referring to FIG. 2, T1 is a face detection time when the face detection unit 10 detects the face A of the person 100. T2 is a matched time when the face comparison unit 11 completes comparison of the face A of the person 100, and confirms matching. The memory control unit 17 starts the pre-recorded image in which the image of the person 100 is recorded in the first memory 13 from the face detection time T1. Thereafter, when comparison of the face A of the person 100 has been completed, and matching is confirmed, the memory control unit 17 finishes the pre-recording of the image of the person 100, and stores the recorded data (recorded data from the face detection time T1 to the matched time T2) which has been pre-recorded, that is, recorded in the first memory 13 in the hard disk 14. In this situation, the memory control unit 17 sets a leading time of the pre-recorded data stored in the hard disk 14 as the face detection time T1 of the person 100.

Since the face detection time T1 of the person 100 is allocated to the pre-recorded data as an index, when search is conducted at the time T1, the pre-recording in which the person 100 is photographed is reproduced. That is, the image of the intended person 100 starts to be reproduced. Since it is assumed from the reproduced image that a person who enters the screen from an end of the screen is a person to be compared, it is not difficult to understand which face has been to be compared during the reproduction.

(Case where Two Persons are Detected (No. 1))

Figure 3:
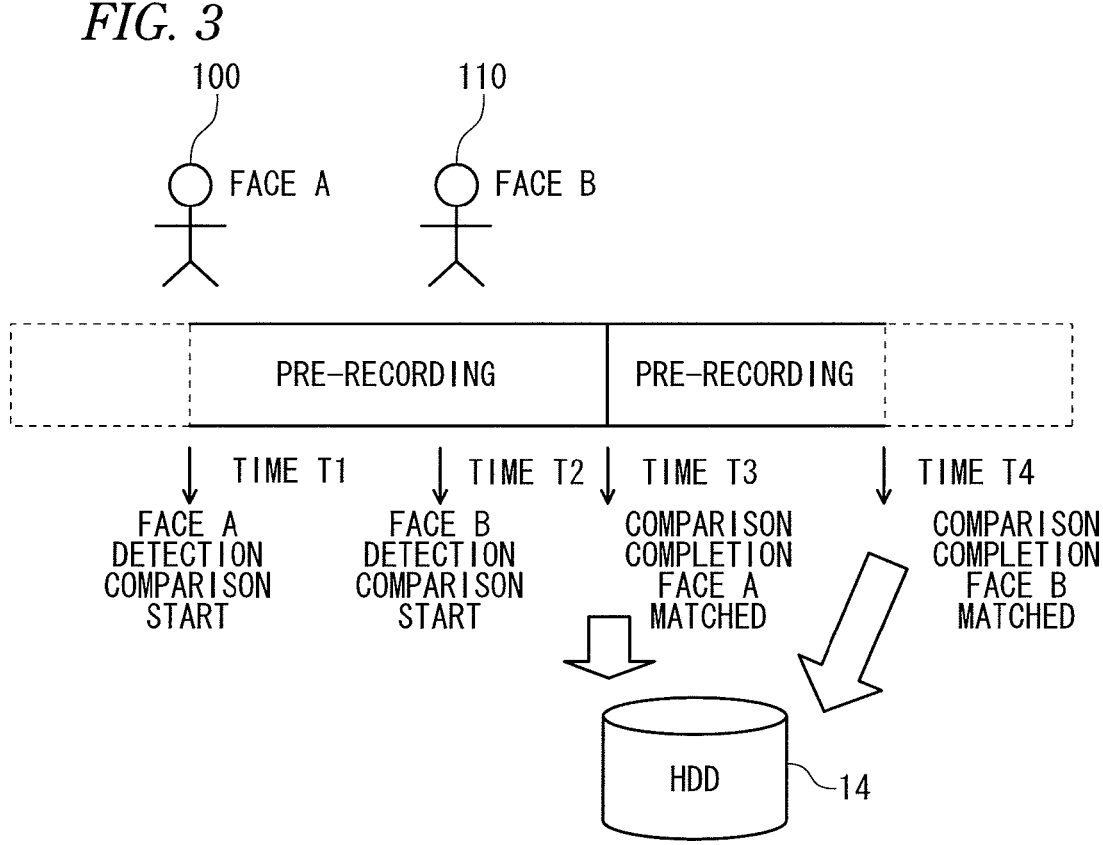
FIG. 3 is a diagram illustrating an outline of the pre-recording process in the pre-record data storage device of FIG. 1.

FIG. 3 is a diagram illustrating an outline of the pre-recording process in a case (1) where two persons 100 and 110 are detected. As illustrated in FIG. 3, the case (No. 1) is that a face B of the person 110 is detected since the face A of the person 100 is detected until comparison of the face A is completed.

Referring to FIG. 3, T1 is the face detection time when the face detection unit 10 detects the face A of the person 100. T2 is a face detection time when the face detection unit 10 detects the face B of the person 110. Also, T3 is a matched time when the face comparison unit 11 completes comparison of the face A of the person 100, and confirms matching. Further, T4 is a matched time when the face comparison unit 11 completes comparison of the face B of the person 110, and confirms matching.

The face comparison unit 11 starts comparison of the face A of the person 100 from the face detection time T1. The memory control unit 17 starts the pre-recording in which the image of the face A of the person 100 is recorded in the first memory 13 from the face detection time T1. Then, when comparison of the face A of the person 100 has been completed, and matching is confirmed, the memory control unit 17 finishes the pre-recording of the image of the person 100, and stores the recorded data (recorded data from the face detection time T1 to the matched time T3) which has been pre-recorded, that is, recorded in the first memory 13 in the hard disk 14. In this situation, the memory control unit 17 sets a leading time of the pre-recorded data stored in the hard disk 14 as the face detection time T1 of the person 100.

The matched time T3 is after the time T2 at which the face comparison unit 11 starts comparison of the face B of the person 110, and the memory control unit 17 starts the pre-recording in which the image of the person 110 is recorded in the first memory 13 from the time T3. Then, when comparison of the face B of the person 110 has been completed, and matching is confirmed, the memory control unit 17 finishes the pre-recording of the image of the person 110, and stores the recorded data (recorded data from the time T3 to the matched time T4) which has been pre-recorded, that is, recorded in the first memory 13 in the hard disk 14. In this situation, the memory control unit 17 sets a leading time of the pre-recorded data stored in the hard disk 14 as the face detection time T2 of the person 110.

Since the face detection time T1 of the person 100 is allocated to the pre-recorded data as an index, when search is conducted at the time T1, the pre-recording in which the person 100 is photographed is reproduced. Also, since the face detection time T2 of the person 110 is allocated to the pre-recorded data as an index, when search is conducted at the time T2, the pre-recording in which the person 110 is photographed is reproduced. In this way, the images of the intended persons 100 and 110 start to be reproduced. This does not make it difficult to understand which face has been to be compared during the reproduction.

(Case where Two Persons are Detected (No. 2))

Figure 4:
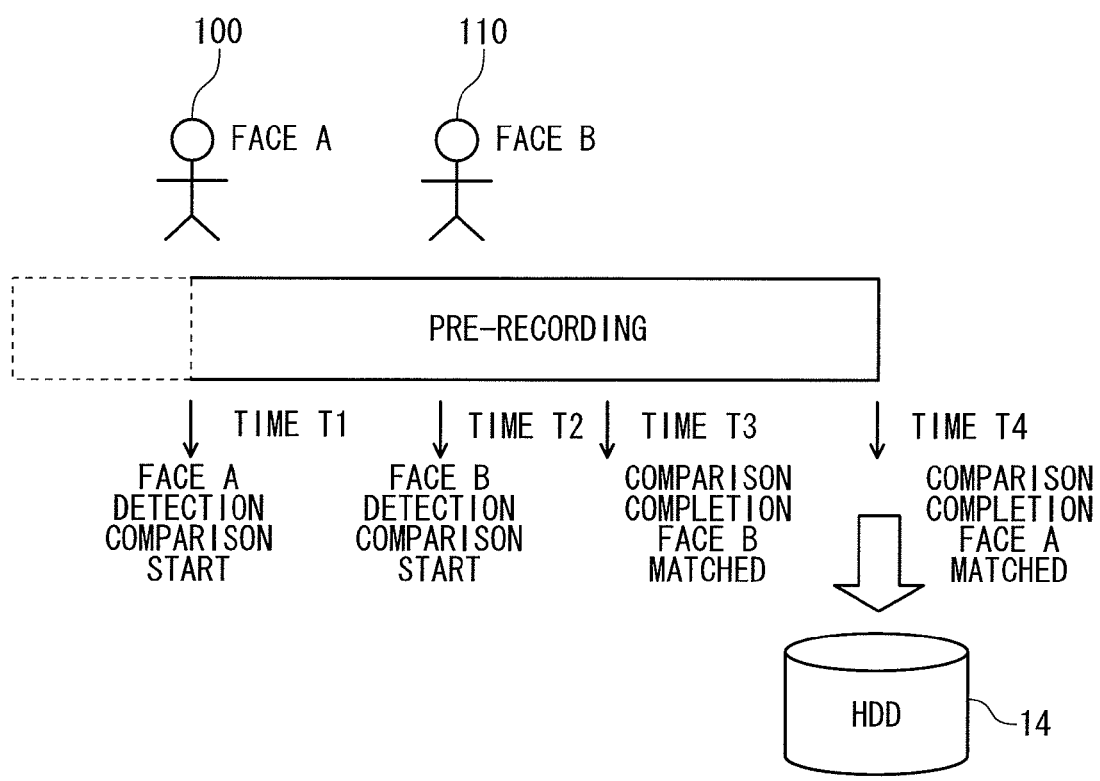
FIG. 4 is a diagram illustrating an outline of the pre-recording process in the pre-record data storage device of FIG. 1.

FIG. 4 is a diagram illustrating an outline of the pre-recording process in a case (2) where the two persons 100 and 110 are detected. As illustrated in the figure, the case (No. 2) is that the detection of the face B of the person 110, and comparison of the face B are conducted since the face A of the person 100 is detected until comparison of the face A is completed.

Referring to FIG. 4, T1 is the face detection time when the face detection unit 10 detects the face A of the person 100. T2 is the face detection time when the face detection unit 10 detects the face B of the person 110. Also, T3 is the matched time when the face comparison unit 11 completes comparison of the face B of the person 110, and confirms matching. Further, T4 is the matched time when the face comparison unit 11 completes comparison of the face A of the person 100, and confirms matching.

The face comparison unit 11 starts comparison of the face A of the person 100 from the face detection time T1. The memory control unit 17 starts the pre-recording in which the image of the person 100 is recorded in the first memory 13 from the face detection time T1. The face comparison unit 11 starts comparison of the face B of the person 110 from the face detection time T2. Then, comparison of the face B of the person 110 is completed at the time T3. Thereafter, comparison of the face A of the person 100 is completed at the time T4. The memory control unit 17 finishes the pre-recording at the time T3, and stores the recorded data (recorded data from the face detection time T1 to the matched time T4) which has been pre-recorded, that is, recorded in the first memory 13 in the hard disk 14. In this situation, the memory control unit 17 sets a leading time of the pre-recorded data stored in the hard disk 14 as the face detection time T1 of the person 100. Since the record of the person 110 is also included in the pre-recorded data, the behavior of the person 110 can be also grasped by reproducing the pre-recorded data.

Since the face detection time T1 of the person 100 is allocated to the pre-recorded data as an index, when search is conducted at the time T1, the pre-recording in which the person 100 is photographed is reproduced. In this situation, the image of the person 110 is also included in the pre-recording in which the person 100. In this way, the images of the intended persons 100 and 110 start to be reproduced. This does not make it difficult to understand which face has been to be matched during the reproduction.

(Case where Two Persons are Detected (No. 3))

Figure 5:
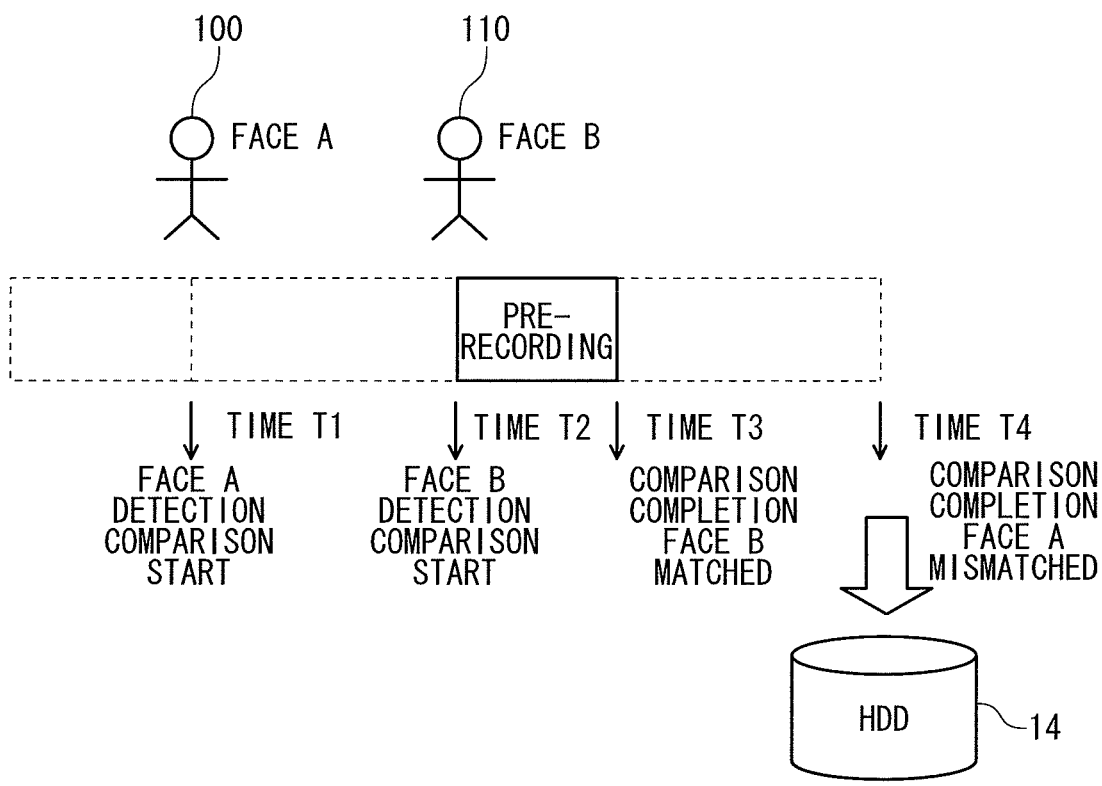
FIG. 5 is a diagram illustrating an outline of the pre-recording process in the pre-record data storage device of FIG. 1.

FIG. 5 is a diagram illustrating an outline of the pre-recording process in a case (3) where the two persons 100 and 110 are detected. As illustrated in the figure, the case (No. 3) is that the detection of the face B of the person 110, and comparison of the face B are completed since the face A of the person 100 is detected until comparison of the face A is completed, and further comparison of the face A is mismatched.

Referring to FIG. 5, T1 is the face detection time when the face detection unit 10 detects the face A of the person 100. Also, T2 is the face detection time when the face detection unit 10 detects the face B of the person 110. Also, T3 is the matched time when the face comparison unit 11 completes comparison of the face B of the person 110, and confirms matching. Further, T4 is a mismatched time when the face comparison unit 11 completes comparison of the face A of the person 100, and confirms mismatching.

The face comparison unit 11 starts comparison of the face A of the person 100 from the face detection time T1. The memory control unit 17 starts the pre-recording in which the image of the person 100 is recorded in the first memory 13 from the face detection time T1. The face comparison unit 11 starts comparison of the face B of the person 110 from the face detection time T2. Thereafter, comparison of the face B of the person 110 is completed at the time T3, and further comparison of the face A of the person 100 is completed at the time T4. In the case (3), since comparison of the face B is matched, and comparison of the face A is mismatched, the memory control unit 17 finishes the pre-recording at the time T4, and stores only the recorded data from the face detection time T2 of the face B of the person 110 to the matched time T3 among the recorded data which has been pre-recorded, that is, recorded in the first memory 13, in the hard disk 14. In this situation, the memory control unit 17 sets a leading time of the pre-recorded data stored in the hard disk 14 as the face detection time T2 of the person 110.

Since the face detection time T2 of the person 110 is allocated to the pre-recorded data as an index, when search is conducted at the time T2, the pre-recording in which the person 110 is photographed is reproduced. In this way, the image of the intended person 110 starts to be reproduced. This does not make it difficult to understand which face has been to be matched during the reproduction.

Subsequently, a description will be given of the operation of the pre-record data storage device 1 according to this embodiment.

Figure 6:
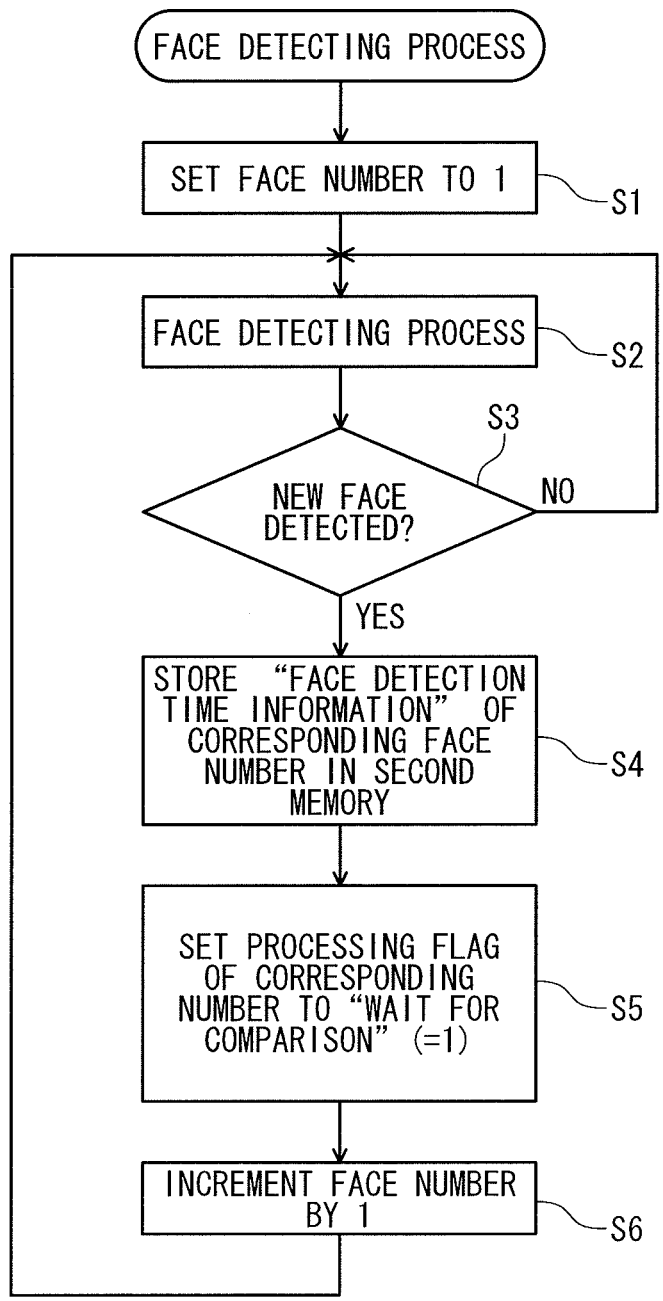
FIG. 6 is a flowchart illustrating a face detecting process in the pre-record data storage device of FIG. 1.

FIG. 6 is a flowchart illustrating a face detecting process in the pre-record data storage device 1 according to this embodiment. The face detecting process is conducted by the face detection unit 10. The face detection unit 10 has a count function of counting face number, and also has a processing flag for the face number.

Referring to FIG. 6, the face number is first set to "1" (Step S1). Thereafter, the face detecting process for detecting the person's face from the image obtained by the camera 2 is conducted (Step S2). Then, it is detected whether a new face is detected in the face detecting process, or not (Step S3). If the new face is not detected, the face detecting process in Step S2 is repetitively conducted until the new face is detected. On the contrary, if the new face is detected, a present time is acquire from the timer unit 12, and this time is recorded in the second memory 15 as "face detection time information" of a corresponding face number (Step S4). After the "face detection time information" of the corresponding number has been recorded, the processing flag of the corresponding face number is set to "wait for comparison (=1)" (Step S5). Thereafter, the face number is incremented by 1 (Step S6), and the flow is returned to Step S2. Subsequently, in the same manner, the present time is acquired from the timer unit 12, and recorded in the second memory 15 as "face detection time information" of the corresponding face number, every time the face of the new person is detected from the image obtained by photographing. Further, the processing flag of the corresponding number is set to "wait for comparison", and the face number is incremented by 1.

Figure 7:
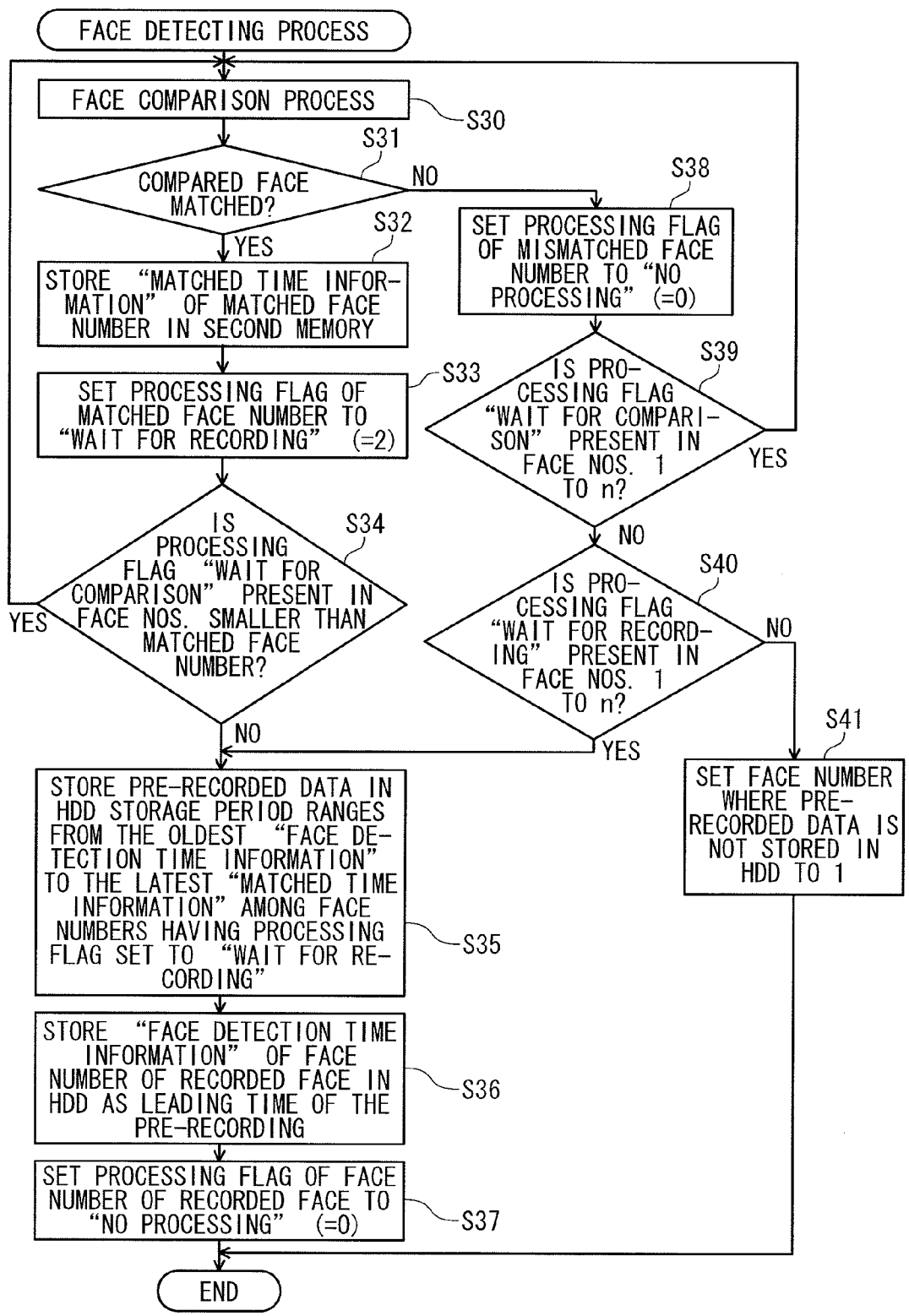
FIG. 7 is a flowchart illustrating the face comparison process in the pre-record data storage device of FIG. 1.

FIG. 7 is a flowchart illustrating the face comparison process in the pre-record data storage device 1 according to this embodiment. The face comparison process is conducted by the face comparison unit 11, the arithmetic unit 16, and the memory control unit 17 in cooperation. The face comparison unit 11 has the processing flag ("wait for recording", "no processing") for the face number.

Referring to FIG. 7, the face comparison process is executed on the person's face detected by the face detection unit 10 (Step S30). It is determined whether the compared face is matched, or not, in the face comparison process (Step S31). If the comparison face is matched, the present time is acquired from the timer unit 12, and this time is recorded in the second memory 15 as "matched time information" of the matched face number (Step S32). Then, the processing flag of the matched face number is set to "wait for recording (=2)" (Step S33). Then, it is determined whether the processing flag "wait for comparison" is present in face number smaller than the matched face number or not (Step S34). If the processing flag "wait for comparison" is present in face number smaller than the matched face number, the flow returns to Step S30, and the face comparison process is again conducted.

On the other hand, if the processing flag "wait for comparison" is not present in face number smaller than the matched face number in the determination of Step S34, the pre-recorded data recorded in the first memory 13 is stored in the hard disk 14 (Step S35). In this case, a storage period of the pre-recorded data ranges from the oldest "face detection time information" to the latest "matched time information" among the face numbers having the processing flag set to "wait for recording".

After the pre-recorded data has been stored in the hard disk 14, "face detection time information" of the face number of the recorded face is stored in the hard disk 14 as a leading time of the pre-recording (Step S36). After the "face detection time information" of the face number of the recorded face has been stored in the hard disk 14 as the leading time of the pre-recording, the processing flag of the face number of the recorded face is set to "no processing (=0)" (Step S37). Thereafter, this processing is finished. After the processing of pre-recording has been finished, the image from the camera 2 is stored in the hard disk 14 for a predetermined time (for example, 10 seconds).

On the other hand, in the determination of the above Step S31, if the compared face is not matched, that is, if mismatched, the processing flag of the mismatched face number is set to "no processing (=0)" (Step S38). Then, it is determined whether the processing flag "wait for comparison" is present, or not, in the face Nos. 1 to n (Step S39). If the processing flag "wait for comparison" is present in the face Nos. 1 to n, the flow is returned to Step S30, and the face comparison process is again conducted. On the contrary, if the processing flag "wait for comparison" is not present in the face Nos. 1 to n, it is determined whether the processing flag "wait for recording" is present, or not, in the face Nos. 1 to n (Step S40). If the processing flag "wait for recording" is present in the face Nos. 1 to n, the flow proceeds to Step S35, and the pre-recorded data recorded in the first memory 13 is stored in the hard disk 14. On the contrary, if the processing flag "wait for recording" is not present in the face Nos. 1 to n, the pre-recorded data is not stored in the hard disk 14. Also, the face number is set to 1 (Step S41), and this processing is finished.

Thus, according to this embodiment, the pre-record data storage device 1 includes the face detection unit 10 that detects the person's face from the image obtained by photographing the person by the camera 2, the face comparison unit 11 that executes the face comparison process on the person's face detected by the face detection unit 10, and the memory control unit 17 that allows the first memory 13 to start pre-recording of the image of the person from the face detection time when the person's face is detected by the face detection unit 10, and to finish the pre-recording at the matched time when matching is confirmed as a result of the face comparison process executed by the face comparison unit 11, and stores pre-recorded data from the face detection time to the matched time in the hard disk 14. As a result, even if it takes time to conduct the face comparison process, the behavior of the person to be compared during the comparison period can be recorded. Also, during reproduction, since the pre-recording of the person whose face is detected and matched is reproduced, it is not difficult to understand which face has been to be compared.

Also, there is provided the second memory 15 that stores the face detection time, and the memory control unit 17 uses the face detection time stored in the second memory 15 as the index time of the pre-recorded data when storing the pre-recorded data from the face detection time of the person to the matched time in the hard disk 14. As a result, the recorded image of the intended person can be reproduced immediately.

In this embodiment, the face detection unit 10 is disposed in the pre-record data storage device 1. Alternatively, the face detection unit may be disposed within the camera 2. In this case, "face detection time information" is transmitted from the camera 2 to the pre-record data storage device 1.

As a hardware configuration of the pre-record data storage device 1 according to the above embodiment, there can be used a computer including a CPU (central processing unit), a volatile memory such as a RAM, a nonvolatile memory such as a ROM, and an interface. In the embodiment, the respective functions of the face detection unit 10, the face comparison unit 11, the timer unit 12, the arithmetic unit 16, and the memory control unit 17 can be realized by causing the CPU to execute a program describing those functions. The program can be stored in a storage medium such as a magnetic disk, a hard disk, an optical disc, a magneto-optical disk, or a semiconductor memory, and distributed.

The present invention has been described in detail with reference to the specific embodiments, but it would be apparent to an ordinary skilled person that the present invention could be variously changed or modified without departing from the spirit and scope of the present invention.

The present invention is based on Japanese Patent Application No. 2010-149274 filed on Jun. 30, 2010, and content thereof is incorporated herein by reference.

INDUSTRIAL APPLICABILITY

The present invention has such an advantage that the behavior of a person to be compared can be surely recorded even if it takes time to conduct the face comparison process such that a plurality of faces is compared with the face information, and can be applied to a security monitoring system.

DESCRIPTION OF REFERENCE SIGNS

1 Pre-record Data Storage Device
2 Camera
3 Display Unit
10 Face Detection Unit
11 Face Comparison Unit
12 Timer Unit
13 First Memory
14 Hard Disk
15 Second Memory
16 Arithmetic Unit
17 Memory Control Unit
18 Image Decode Unit

The invention claimed is:

1. A pre-record data storage device comprising:
a first recorder;
a second recorder having a capacity larger than a capacity of the first recorder;
a face comparison processor that executes a face comparison process to compare a person's face detected from an image obtained by photographing the person with registered face information; and
a recording controller that allows the first recorder to start recording from a face detection time when the person's face is detected until a matched time when the detected person's face matches the registered face information at the face comparison processor, to record pre-recording data, and when the detected person's face matches the registered face information at the face comparison processor, stores the pre-recording data from the face detection time to the matched time in the second recorder.

2. The pre-record data storage device according to claim 1, wherein when the detected person's face does not match the registered face information at the face comparison processor, the pre-recording data is not stored in the second recorder.

3. The pre-record data storage device according to claim 1, further comprising:
a face detecting time storage that stores the face detection time,
wherein the recording controller uses the face detection time stored in the face detection time storage as an index time of the pre-recording data when the pre-recording data is stored from the face detection time to the matched time in the second recorder.

4. A pre-record data storage method comprising:
executing a face comparison process to compare a person's face detected from an image obtained by photographing a person with registered face information; and
allowing a first recorder to start recording from a face detection time when the person's face is detected until a matched time when the detected person's face matches the registered face information, to record pre-recording data, and when the detected person's face matches the registered face information, storing the pre-recording data from the face detection time to the matched time in a second recorder having a capacity larger than a capacity of the first recorder.

5. A non-transitory computer readable storage medium storing one or more programs, the one or more programs comprising instructions, which, when executed by a pre-record data storage device, cause the device to:
execute a face comparison process to compare a person's face detected from an image obtained by photographing a person with registered face information; and
allow a first recorder to start recording from a face detection time when the person's face is detected until a matched time when the detected person's face matches the registered face information, to record pre-recording data, and when the detected person's face matches the registered face information, storing the pre-recording data from the face detection time to the matched time in a second recorder having a capacity larger than a capacity of the first recorder.

* * * * *